C. STEENSTRUP.
SHAFT COUPLING.
APPLICATION FILED DEC. 6, 1918.
1,408,041.
Patented Feb. 28, 1922.
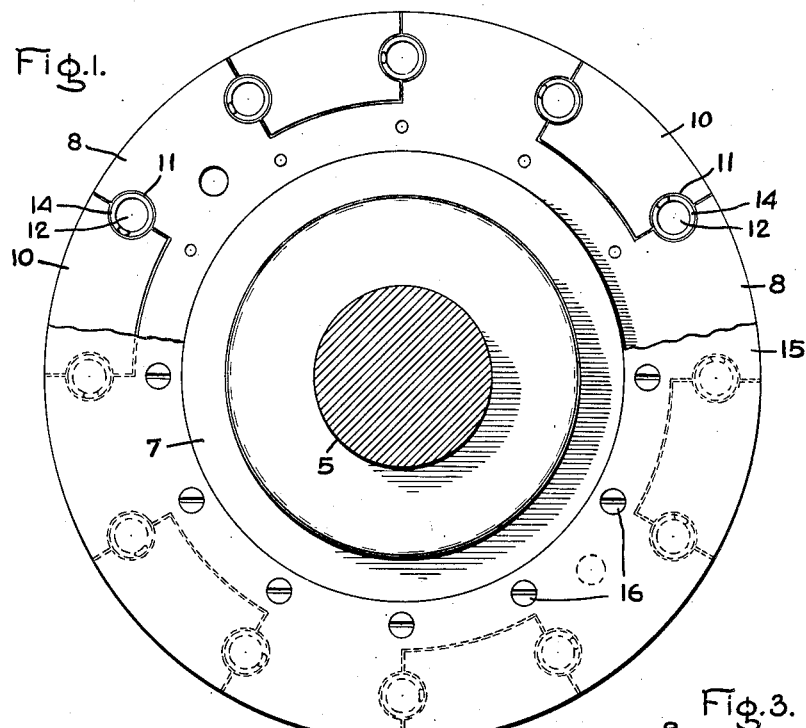
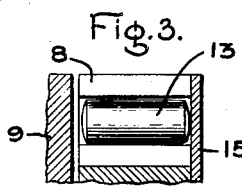
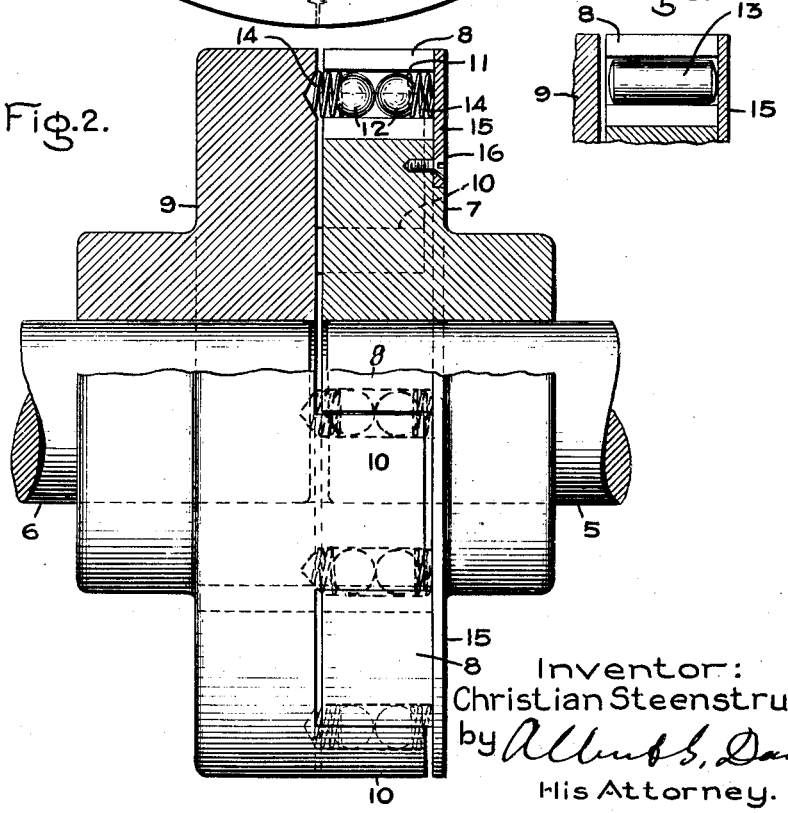
Inventor:
Christian Steenstrup,
by Albert G. Davis
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

SHAFT COUPLING.

1,408,041.  Specification of Letters Patent.  Patented Feb. 28, 1922.

Application filed December 6, 1918. Serial No. 265,630.

*To all whom it may concern:*

Be it known that I, CHRISTIAN STEENSTRUP, a citizen of the United States, residing at Schenectady, in the county of Schenectady, State of New York, have invented certain new and useful Improvements in Shaft Couplings, of which the following is a specification.

The present invention relates to couplings such as are used to connect together two shafts, for example, a driving shaft and a driven shaft, and particularly to what are usually termed jaw couplings.

Jaw couplings comprise in general two face plates which are fixed to adjacent shaft ends and are connected to each other by interleaving jaws having faces which engage to impart turning movement from one shaft to the other, the arrangement being such that the jaws can slide axially on each other to permit of axial adjustment of the shafts relatively to each other. In such couplings the load should be equally distributed among the engaging faces of the jaws so the pressure on the various faces are substantially the same but from a practical standpoint this is difficult to accomplish and in any event requires most careful machine work and fitting. If the fitting is not extremely accurate one or a few of the jaws will carry the most of the load with the result that such jaws due to the extreme pressures to which they are subjected will wear rapidly and will also be likely to bind or stick thus interferring with axial adjustments of the shafts. Furthermore, in commercial practice it is not possible to obtain such accurate work that the jaws contact over any great extent of their engaging surfaces so that in general the engagement is over a very small area and may be only a line contact.

One object of my invention is to provide an improved coupling which lends itself to being manufactured with a high degree of accuracy at a minimum cost.

A further object is to provide an improved structure which will give a uniform distribution of the load, which will permit of axial movement freely taking place, and which is not likely to bind or stick.

For a consideration of what I believe to be novel and my invention, attention is directed to the accompanying description and the claims appended thereto.

In the drawing, Fig. 1 is an end view of a coupling embodying my invention a part of a cover ring being broken away to show the parts behind it; Fig. 2 is a side elevation partly in radial section of Fig. 1, and Fig. 3 is a detail of a modification.

Referring to the drawing, 5 and 6 indicate two adjacent shaft ends which are to be coupled together, one being a driving shaft and the other a driven shaft. On shaft 5 is a face plate 7 having radially projecting jaws 8 at its periphery. On shaft 6 is a face plate 9 having axially projecting paws 10 at its periphery. The jaws 8 and 10 interleave in the well known manner to form a jaw coupling.

In manufacturing a coupling embodying my invention, I first form the two face plates 7 and 9 with jaws 8 and 10 thereon making the jaws of such dimensions that they interleave with a small amount of clearance. I then clamp the two face plates rigidly together with the jaws interleaved but with their faces slightly spaced apart, and drill and ream axially extending holes as indicated at 11 between the adjacent faces of the jaws. This results in the formation of opposed recesses in the adjacent faces of the jaws. After holes 11 have been drilled and reamed, the coupling may be unclamped and suitably heat-treated as found desirable, for example, pack hardened. The coupling is then clamped together again and the holes 11 ground out very accurately to size. At the same time the center openings may be ground to fit the shafts. After holes 11 are ground to size, filling members are inserted in them which may be in the form of one or more balls 12 as shown in Figs. 1 and 2, or in the form of short plugs or pins 13 as shown in Fig. 3. The balls 12 or the pins 13 are made to fit holes 11 accurately and with a very slight clearance. To center the filling members when they are in the form of balls 12, I preferably provide small coiled springs 14 on each side of them and to retain the filling members and springs in the holes I provide a cover ring 15 held in place by screws 16. Springs 14 prevent the balls 12 from pushing up to one end of the holes 11 and in this way making it had for the coupling to slide axially, as each time the load is taken off the coupling the balls or the pins will be centered by the springs.

A coupling as described can be manufactured at a reasonable cost by following my improved method and as will be readily understood each filling member, as the balls or pins, will take its proper share of the load and without throwing the coupling out of alignment. Also the coupling will slide axially easily particularly in the case where the filling members are in the form of balls as shown in Figs. 1 and 2, and in any event it will not be likely to bind or stick.

It will also be noted that my improved coupling may operate in either direction with equal accuracy of engagement.

In accordance with the provisions of the patent statutes, I have described the principle of my invention, together with the apparatus which I now consider to represent the best embodiment thereof but I desire to have it understood that the apparatus is only illustrative and that the invention can be carried out by other means.

What I claim as new and desire to secure by Letters Patent of the United States, is:

1. In a jaw coupling, a pair of face plates having interleaving jaws, adjacent faces of said jaws being in spaced relation to each other and provided with semi-circular opposed axially extending recesses, and solid circular filling members which fit in said recesses and fill the same, said jaws being adapted to slide axially on said filling members to permit of axial adjustment in the coupling.

2. In a jaw coupling, a pair of face plates having interleaving jaws, adjacent faces of said jaws being in spaced relation to each other and provided with opposed recesses, filling members in said recesses through which power is transmitted from one face plate to the other, and spring means centering said filling members.

3. In a jaw coupling, a pair of face plates having interleaving jaws, adjacent faces of said jaws being in spaced relation to each other and provided with opposed axially extending recesses, and balls in said recesses through which power is transmitted from one face plate to the other.

4. In a jaw coupling, a pair of face plates having interleaving jaws, adjacent faces of said jaws being provided with opposed recesses, balls in said recesses, and springs for centering said balls.

5. In a jaw coupling, a pair of face plates having interleaving jaws, adjacent faces of said jaws being provided with opposed recesses, balls in said recesses, spring means for centering said balls, and means for retaining said balls and springs in the recesses.

In witness whereof, I have hereunto set my hand this 5th day of December, 1918.

CHRISTIAN STEENSTRUP.